(12) United States Patent
Worofka (10) Patent No.: US 12,455,179 B2
(45) Date of Patent: Oct. 28, 2025

(54) METHOD FOR MOUNTING A MAGNET OF A HALL SENSOR ON A ROTOR SHAFT

(71) Applicant: Baumueller Nuernberg GmbH, Nuremberg (DE)

(72) Inventor: Nicolas Worofka, Fuerth (DE)

(73) Assignee: Baumueller Nuernberg GmbH, Nuremberg (DE)

( * ) Notice: Subject to any disclaimer, the term of this patent is extended or adjusted under 35 U.S.C. 154(b) by 112 days.

(21) Appl. No.: 18/214,481

(22) Filed: Jun. 26, 2023

(65) Prior Publication Data
US 2024/0011805 A1 Jan. 11, 2024

(30) Foreign Application Priority Data
Jun. 27, 2022 (DE) .................. 10 2022 206 457.7

(51) Int. Cl.
| | |
|---|---|
| G01D 11/30 | (2006.01) |
| B25B 27/02 | (2006.01) |
| G01D 5/14 | (2006.01) |
| G01P 3/44 | (2006.01) |

(52) U.S. Cl.
CPC .............. *G01D 11/30* (2013.01); *B25B 27/02* (2013.01); *G01D 5/142* (2013.01); *G01P 3/44* (2013.01)

(58) Field of Classification Search
CPC ...................................... G01D 11/30
USPC ....................................... 73/866.5
See application file for complete search history.

(56) References Cited

U.S. PATENT DOCUMENTS

| | | | |
|---|---|---|---|
| 9,954,421 B2 | 4/2018 | Roos | |
| 2023/0006519 A1 | 1/2023 | Sinnl | |

FOREIGN PATENT DOCUMENTS

| | | | |
|---|---|---|---|
| DE | 102015002562 A1 | | 9/2016 |
| DE | 202019100608 U1 | * | 4/2019 |
| DE | 102019218441 A1 | | 6/2021 |
| JP | 2012005260 A | * | 1/2012 |

OTHER PUBLICATIONS

Nidec. Machine translation of DE-202019100608-U1. Published Mar. 2019. Translated Dec. 2024. (Year: 2019).*
Matsuda et al. Machine translation of JP-2012005260-A. Published Jan. 2012. Translated Dec. 2024. (Year: 2012).*

* cited by examiner

*Primary Examiner* — Walter L Lindsay, Jr.
*Assistant Examiner* — Philip T Fadul
(74) *Attorney, Agent, or Firm* — Muncy, Geissler, Olds & Lowe, P.C.

(57) ABSTRACT

A method for mounting a magnet of a Hall sensor on a rotor shaft of an electric machine with the aid of an adapter. The magnet is inserted into a receptacle of the adapter in an axial direction in such a way that the magnet is at least partially surrounded by the adapter on the circumferential side in the radial direction. The adapter is plastically deformed to the inside in the radial direction in such a way that the magnet is held in the receptacle. A stamp as well as an electric machine are also provided.

11 Claims, 3 Drawing Sheets

METHOD FOR MOUNTING A MAGNET OF A HALL SENSOR ON A ROTOR SHAFT

This nonprovisional application claims priority under 35 U.S.C. § 119(a) to German Patent Application No. 10 2022 206 457.7, which was filed in Germany on Jun. 27, 2022, and which is herein incorporated by reference.

BACKGROUND OF THE INVENTION

Field of the Invention

The present invention relates to a method for mounting a magnet of a Hall sensor on a rotor shaft. The rotor shaft is a constituent part of an electric machine. The invention also relates to a stamp, as well as the use of a stamp, and an electric machine.

Description of the Background Art

Electric machines are used for a multiplicity of different tasks. If an electric machine is designed as an electric motor, it is usually used to drive a component. The electric machine is, for example, a constituent part of an industrial plant, and the driven component is, for example, an actuator, with the aid of which a creation and/or processing of workpieces take(s) place. However, it is also possible to use an electric motor of this type to drive a motor vehicle. In this case, a wheel or a gearbox operatively connected to a wheel is driven with the aid of the electric motor. The motor vehicle is thus designed as an electric vehicle. In this way, it is possible to operate the motor vehicle emissions-free, at least locally. The motor vehicle is, for example, a construction machine or an agricultural machine. It is also possible to design the motor vehicle as a snowcat or the like. However, even passenger cars or other vehicles used for transport or leisure activities are increasingly being driven with the aid of a corresponding electric motor.

Regardless of the particular application, the part driven with the aid of the electric motor is usually to be brought to a certain position or a certain speed. As a result, it is necessary to set and thus regulate the supply of power to the electric motor, depending on a rotational speed of the electric motor. It is, in turn, necessary for the rotational speed of a rotor shaft of the electric motor to be detected. A sensor, such as a Hall sensor, is customarily used for this purpose. The latter includes a magnet fastened to the rotor shaft of the rotor, with the aid of which a temporally variable magnetic field is generated during the rotation of the rotor shaft. The magnetic field is detected with the aid of the actual sensor of the Hall sensor, the Hall effect being used therefor. The sensor is usually held in a rotationally fixed manner and spaced a short distance apart from the magnet, so that the detection of the rotational speed takes place without touching.

During mounting, it is necessary to captively fasten the magnet to the rotor shaft. Adhesive is customarily used for this purpose. However, the feeding of the adhesive is comparatively time-consuming, an adhesion to the magnet on the rotor shaft not being ensured if too little adhesive is used. If too much adhesive is used, an extension of the rotor shaft is enlarged, and material costs are excessively increased. It is also possible that the magnet slips with respect to the rotor shaft during the drying phase of the adhesive, so that no precise alignment is present.

SUMMARY OF THE INVENTION

It is therefore an object of the present invention to provide a particularly suitable method for mounting a magnet of a Hall sensor on a rotor shaft of an electric machine, as well as a particularly suitable stamp, as well as a particularly suitable use of a stamp, and a particularly suitable electric machine, a mounting being advantageously simplified, and an accuracy and a duration of use being increased.

The method may be used to mount a magnet of a Hall sensor on a rotor shaft of an electric machine. For example, the electric machine is an asynchronous machine or particularly preferably a synchronous machine. The electric machine is advantageously provided with a brushless design. The electric machine is, for example, a generator or particularly preferably an electric motor. A component is driven with the aid of the electric motor during operation. For example, the electric machine is a constituent part of an industrial plant, and the driven component is, particular, an actuator, with the aid of which a processing and/or creation of a workpiece take(s) place. Alternatively, the electric machine is a constituent part of a motor vehicle, an auxiliary unit, for example, being driven with the aid of the electric machine. The electric machine is particularly preferably a constituent part of a main drive and is suitable, in particular provided and configured, for this purpose. The driven component is thus a wheel or a gearbox operatively connected to the wheel.

The motor vehicle can be, for example, a commercial vehicle, such as a truck or bus. Alternatively, the motor vehicle is an agricultural machine, such as a traction engine, a combine, or a tool/actuator pulled with the aid of a traction engine, such as a planting machine. In a further alternative the motor vehicle is a construction vehicle or, for example, a passenger car. Alternatively, the motor vehicle is a motorcycle or a so-called e-bike.

The rotor shaft can be made from steel, for example, high-grade steel, so that a comparatively robust electric machine is provided. In particular, the rotor shaft is rotatably supported around a rotor axis, which is also referred to as a rotation axis, and which is preferably arranged concentrically to the rotor shaft. The electric machine advantageously includes one or multiple bearings, with the aid of which a support of the rotor shaft takes place. The bearings are preferably each connected to an end shield, with the aid of which a housing is closed, within which the rotor of the electric machine is advantageously arranged. The rotor is preferably rotatably fixedly fastened to the rotor shaft. In particular, the rotor comprises a number of permanent magnets. The electric machine suitably includes a stator, with the aid of which the rotor is surrounded, for example, on the circumferential side. The stator preferably comprises a number of electric magnets which are advantageously interconnected to form multiple phases. The same number of electric coils are suitable assigned to each of the phases. The number of phases is advantageously equal to three. The (electric) phases are interconnected, for example, to form a star or delta circuit. During the operation of the electric machine, a supply of power to the phases suitably takes place with the aid of a converter, which is designed, in particular, in the manner of a bridge converter, preferably as a B6 converter.

The Hall sensor can comprise a sensor, which is designed, for example, as a chip, and which is fastened, in particular, to a circuit board. In the mounted state, the sensor is preferably held in a rotatably fixed manner, for example on one of the possible end shields. The Hall sensor also comprises the magnet, which is fastened to the rotor shaft in the mounted state, in particular in a rotatably fixed manner. The magnet is preferably provided with a cylindrical design and is suitably magnetized perpendicularly to the rotor axis and/or diametrically through its center point. In the mounted state, the rotor axis preferably extends through the magnet, and, with the exception of its magnetization, the magnet is rotationally symmetrical with respect to the rotor axis. For example, the magnet is made from a ferrite, iron, or rare earth material.

To fasten the magnet, which is preferably a permanent magnet, to the rotor shaft, an adapter can be used, which is advantageously made from a metal, so that a robustness is increased. A hardness of the material of the adapter is suitably less than a hardness of the material of the rotor shaft. The adapter is suitable made from a diamagnetic or paramagnetic material. Due to the adapter, the magnetic field lines generated with the aid of the magnet are thus only slightly modified. The adapter is preferably manufactured from an aluminum, i.e., for example, pure aluminum, or an aluminum alloy. The adapter includes a receptacle, which is provided, for example, with a cup- or pot-shaped design. In other words, the receptacle is designed in the manner of a rotationally symmetrical indentation. The receptacle is preferably rotationally symmetrical with respect to the rotor axis in the mounted state. The dimensions of the receptacle are suitably designed in such a way that the magnet may be inserted into the receptacle without force.

According to the method, the magnet can be inserted into the receptacle of the adapter, the direction of the insertion being the axial direction. The axial direction can be determined equally with respect to the adapter and/or the magnet, and, in the mounted state, the axial direction of the magnet/adapter is in parallel to the rotation axis of the rotor shaft. An axis of the cylindrical magnet is preferably in parallel to the axial direction. Due to the insertion, the magnet is at least partially surrounded by the adapter on the circumferential side in a radial direction, which is perpendicular to the axial direction. The radial direction is defined, in particular, with respect to the magnet and/or the adapter. In the mounted state on the rotor shaft, the radial direction is preferably oriented perpendicularly to and intersects the rotation axis. In summary, the magnet is thus inserted into the receptacle of the adapter in the axial direction in such a way that the magnet is at least partially surrounded by the adapter on the circumferential side in the radial direction.

Due to the insertion and/or the dimensions of the magnet/receptacle, the magnet can be completely surrounded by the receptacle on the circumferential side, the magnet being advantageously provided with a cylindrical design. An end face of the magnet is suitably flush with a boundary of the receptacle of the adapter and/or perpendicular to the axial direction. The insertion in the axial direction advantageously takes place without force, and a clearance fit is created between the receptacle and the magnet. In particular, a size of the receptacle with respect to the magnet is between $10/100$ mm and $2/100$ mm, preferably equal to $5/100$ mm larger than the outer dimensions of the magnet.

Upon conclusion of this work step, the magnet is thus situated within the receptacle, so that a position of the magnet is predefined with the aid of the adapter. The magnet is not yet fastened to the adapter, and it is still possible, for example, to remove the magnet from the adapter. Due to the, in particular, force-free insertion, however, a damage to the magnet and/or the adapter must be avoided. In particular, the receptacle and/or the magnet is/are oriented in such a way that, when the adapter and the magnet are mounted on the rotor shaft, they are rotationally symmetrical with respect to the rotation axis.

In a subsequent work step, the adapter is plastically deformed to the inside in the radial direction in such a way that the magnet is held in the receptacle. In particular, for the purpose of plastic deformation, a force is applied inwardly to the adapter in the radial direction, in particular to the portion of the adapter by which the magnet is at least partially surrounded. A cold caulking preferably takes place. In other words, the magnet and the adapter are preferably cold-caulked to each other. The adapter is preferably made from an aluminum, for which reason the forces necessary for the plastic deformation are comparatively low. For example, a force fit between the adapter and the magnet takes place, due to the plastic deformation. A force between 1 kN and 10 kN is preferably applied to the adapter for the purpose of deformation. Due to the use of the adapter, it is possible to manufacture the latter from a comparative soft material, so that comparatively little force must be applied for the purpose of plastic deformation. The rotor shaft may be manufactured from a comparatively hard material, for which reason a robustness of the electric machine is nevertheless increased.

Due to the method, the magnet is nondetachably connected to the adapter, for which reason a detachment of the magnet from the adapter and thus also from the rotor shaft is avoided even upon a comparatively high load on the electric machine. Due to the force-free insertion of the magnet into the receptacle, a load on the magnet is comparatively low, so that a damage is avoided. In other words, no damage to the magnet occurs, which is manufactured, for example, from a comparatively fragile/brittle material, since no force is essentially necessary to insert the magnet into the receptacle, or at least no friction occurs between the adapter and the magnet, or at least the insertion of the magnet is not hindered by the adapter. Due to the deformation of the adapter, no single-point loading of the magnet occurs, so that a damage to the magnet is avoided here as well. In other words, a breakage of the magnet is ruled out due to the procedure, which simplifies a mounting. Rejects are thus reduced. Due to the receptacle, the position of the magnet is also comparatively precise, so that an a misalignment of the magnet does not occur during mounting, for which reason an accuracy is increased for detecting the position. No additional materials are also necessary, which reduces manufacturing costs. Since the magnet may also be detached from the adapter only by means of destruction, a robustness is increased, and an undesirable detachment from the adapter is avoided. A service life is thus increased.

In particular, the adapter forms a single piece and is primary-shaped. The adapter is advantageously provided with an essentially rotationally symmetrical design, in particular with respect to an axis which is in parallel to the axial direction and which coincides with the rotation axis/rotor axis of the rotor shaft in the mounted state. In deviation from the complete rotational symmetry, a venting bore, for example, is present, with the aid of which a formation of an overpressure due to the insertion of the magnet is avoided. The adapter is advantageously provided with a mushroom- or rivet-shaped design, which simplifies a mounting. In other words, the adapter is essentially nail-shaped, the receptacle being introduced, in particular, into the head. The receptacle is advantageously rotationally symmetrical with respect to the axis, which coincides with the rotation axis of the rotor shaft in the mounted state.

In particular, an outer wall of the receptacle is provided with a smooth design, so that a manufacturing of the adapter is made easier. For example, the magnet has a structure on its circumference, with which the adapter at least partially engages, due to the plastic deformation. The structure is designed, for example, in the manner of a groove or chamfer.

Alternatively, the magnet is smooth on the outside, which makes a manufacturing easier. During the plastic deformation, the adapter is advantageously deformed in such a way that the magnet is encompassed by the adapter, in particular in the axial direction. In other words, the opening of the receptacle, through which the magnet was inserted thereinto, is at least partially reduced in size, so that the magnet is held securely in the receptacle. On the one hand, a detachment of the magnet from the adapter is thus avoided. On the other hand, no special adaptation/processing of the magnet and the adapter is necessary in this way, for which reason manufacturing costs and a manufacturing time are reduced.

To plastically deform the adapter, for example, the adapter is encompassed by two press jaws, which are to be moved toward each other. However, an inwardly directed force in the radial direction is particularly preferably applied to the adapter on the circumferential side or at least in a uniformly circumferential manner, so that the formation of an imbalance due to an irregular shape of the adapter is avoided. A stamp is advantageously used for the purpose of deformation, which has a stamp opening. The latter is oriented, in particular, in the axial direction, and the stamp opening has a flank which is inclined as usual with regard to the radial direction and thus also, in particular, with regard to the axial direction. The flank is oriented, in particular, in the direction of the opening of the stamp opening, i.e., the entrance of the stamp opening.

According to the method, the stamp is moved in the axial direction in such a way that the adapter is deformed with the aid of the flank, i.e., in particular, the adapter is deformed plastically to the inside in the radial direction. The force needed for the plastic deformation is applied for this purpose to at least one part of the adapter with the aid of the flank. The stamp is preferably moved in the axial direction with respect to the adapter, so that the adapter plunges, for example, increasingly into the stamp opening and is moved at least partially along the flank. Due to the slanted, i.e. inclined, flank, a portion of the material of the adapter thus flows to the inside in the radial direction and in the direction of the magnet, so that, for example, the force fit is implemented.

The stamp opening has, in particular, a base, which is arranged perpendicularly to the axial direction, with the aid of which, for example, a plunging of the magnet and/or the adapter is limited in the axial direction. The magnet is oriented, in particular, in the direction of the base with respect to the adapter. For example, a limiting of the stamp opening is implemented with the aid of the flank, so that the stamp opening is provided with a conical design. A manufacturing of the stamp is simplified in this way. However, the flank is particularly preferably offset a short distance to the inside away from an edge-side boundary of the stamp opening in the radial direction and is provided, for example with the aid of a nose, which is connected to the possible base or is preferably formed thereon. A groove or the like is thus introduced into an end face of the adapter with the aid of the nose, so that the material is pressed to the inside in the radial direction, and the fastening of the magnet to the adapter takes place thereby. The outer dimensions of the adapter are not changed, for which reason an imbalance or the like is avoided.

For example, the magnet is first fastened to the adapter, and the adapter is then fastened to the rotor shaft. it is thus possible to prefabricate the magnet fastened to the adapter. However, the rotor shaft is particularly preferably first positioned in a mounting opening of the rotor shaft for the purpose of mounting the adapter. The mounting opening is, in particular, introduced into an end face of the rotor shaft and preferably concentrically to the rotor axis. In other words, the mounting opening extends along the rotor axis. The mounting opening is suitably designed in the manner of a blind hole. A mechanical integrity of the rotor shaft is thus narrowed only to a comparatively small degree. A force fit is suitably implemented between the adapter and the mounting opening, so that an application of force is increased to mount the adapter. However, a detachment of the adapter from the rotor shaft is avoided. For mounting, force is applied only to the adapter, for which reason a damage to the magnet is avoided.

For example, the magnet is subsequently set into the receptacle, or the magnet was already present in the receptacle, when the adapter is positioned in the mounting opening of the rotor shaft. In this case, however, the magnet is preferably not yet held on the adapter. The adapter is advantageously pressed into the mounting opening in the axial direction with the aid of the stamp. In particular, this takes place in one work step with the plastic deformation of the adapter for holding the magnet, for which reason the number of necessary work steps is reduced. In summary, the final fastening of the adapter and the magnet to the adapter takes place in a joint work step, for which reason a manufacturing time is reduced.

The stamp is preferably designed in such a way that the adapter is first pressed into the mounting opening and, when the latter reaches a certain position, the adapter is plastically deformed, due to the existing force. In particular, the adapter has corresponding stops for the stamp, preferably the stamp opening. A press fit between the adapter and the rotor shaft is suitably implemented hereby, so that a rotation thereof with respect to each other is prevented. When pressing the adapter into the rotor shaft, the adapter is preferably additionally at least slightly plastically deformed, so that a detachment of the adapter from the rotor shaft is avoided. In particular, the mounting opening has an inner toothing on the inside, so that a prevention of the adapter from rotating with respect to the rotor shaft is implemented.

The stamp is used to carry out the method for mounting a magnet of a Hall sensor on a rotor shaft of an electric machine and is suitable, in particular provided and configured, for this purpose. The stamp comprises a stamp opening having a flank inclined with respect to an axial direction. The cross section of the stamp opening is suitably round perpendicularly to the axial direction. The stamp opening is preferably rotationally symmetrical with respect to an axis running in parallel to the axial direction. The axial direction is, in particular, in parallel to a rotation axis of the rotor shaft when the magnet is mounted on the rotor shaft. In other words, the axial direction along which the stamp opening extends is in parallel to or equal to an axial direction of the adapter and the magnet, and it is, in turn, preferably in parallel to the rotor axis of the rotor shaft. In particular, the stamp is rotationally symmetrical with respect to an axis running in parallel to the axial direction, the adapter inserted into the stamp opening also being provided with a rotationally symmetrical design with respect thereto. The stamp is suitably made from a steel, preferably hardened steel. A deformation of the adapter is made easier thereby, in particular if the latter is made from an aluminum. A wear on the stamp is reduced in this case, and the stamp may be used for carrying out the method multiple times.

For example, the stamp opening can be provided with an essentially conical design, advantageously tapering in a conical manner, so that the flank is provided with the aid of an edge of the stamp opening. However, the stamp opening particularly preferably has a base perpendicular with respect to the axial direction, which comprises a protruding nose. The nose is offset away from the edge of the base, and the nose is at least partially provided with a protruding design in the axial direction, so that it at least partially projects into the stamp opening. In particular, the cross section of the nose has a V shape. A V-shaped notch thus occurs in the end face when pressing an end face of the adapter running perpendicularly to the axial direction into the nose. In this way, the deformation of the adapter is simplified hereby, since the application of force for this purpose is initially low. In addition, no overloading occurs, due to the shape, so that a breakage or other damage to the adapter is avoided.

For example, only one nose of this type may be present, or the stamp includes multiple noses, which are, however, separated from each other. In this way, a deformation of the adapter only in sections occurs, for which reason the force to be applied for deformation is reduced. However, the nose is particularly preferably provided with a circumferential design with respect to the radial direction. In particular, a ring is thus formed with the aid of the nose, which is preferably arranged concentrically to a center axis of the stamp opening. In this way, no imbalance is introduced into the adapter during the deformation of the adapter, but instead the latter is also deformed in a circumferential manner.

The nose can be arranged in such a way that it is spaced a distance apart from the magnet, so that a damage to the magnet due to the nose is avoided. However, a distance of the nose from the magnet is suitably less than the distance of the nose to the outer end of the adapter in the radial direction. In this way, a required force for deforming the part of the adapter facing the magnet, so that the magnet is held in the receptacle, is reduced.

For example, the base is provided with a continuous design and, for example, a flat surface area. However, the base is particularly preferably partially recessed at least on the inside, and an indentation is thus introduced into the base. With the aid of the indentation, the magnet and advantageously a part of the adapter, in particular, are covered, so that this part and the magnet do not rest directly against the base. Due to the indentation, it is possible for the adapter to be at least partially deformed into the indentation during the deformation thereof, and the material of the adapter may be displaced thereinto. As a result, the material accumulates on the end face of the magnet, so that the magnet is nondetachably connected to the adapter. In particular, the possible noses directly rest against the indentation on the circumferential side in the radial direction.

For example, only the indentation is present, so that a contact of the magnet with the aid of the stamp is prevented. However, the stamp particularly preferably comprises a device for limiting the force to be applied to the magnet. When carrying out the method, the device at least temporarily rests against the magnet, so that the position of the magnet with respect to the adapter is stabilized with the aid of the device without an overloading of the magnet taking place. The device is advantageously integrated into the base, preferably into the indentation, and thus stabilized in this location. The carrying out of the method is made easier in this way. Due to the device, it is thus ensured that a damage to the magnet is prevented, despite the force applied to the adapter and leading to the plastic deformation.

In particular, the device comprises a sphere, which is spring-loaded. The sphere is advantageously movably supported in the axial direction between two stops and, in the unused state, protrudes partially over the base and thus projects into the stamp opening. As a result, when the adapter of the magnet is inserted, the device first comes into contact with the magnet, so that a misalignment of the magnet with respect to the receptacle is avoided. Once the flank of the stamp rests against the adapter, the deformation takes place, and the sphere retreats in the axial direction against the pressure of the spring, so that the forced used to deform the adapter does not act directly and completely upon the magnet.

A stamp, which has a stamp opening with a flank inclined with respect to an axial direction, is used to carry out a method for mounting a magnet of a Hall sensor on a rotor shaft of an electric machine with the aid of an adapter. In the method, the magnet is inserted into a receptacle of the adapter in the axial direction in such a way that the magnet is at least partially surrounded by the adapter on the circumferential side in a radial direction. The adapter is plastically deformed to the inside in a radial direction in such a way that the magnet is held in the receptacle. For this purpose, the adapter is positioned in the stamp opening of the stamp, and the stamp is moved in the axial direction in such a way that the adapter is deformed with the aid of the flank.

The electric machine can be, for example, a generator or an electric motor and includes a rotor shaft. In particular, a rotor is rotatably fixedly fastened to the rotor shaft. The rotor shaft is advantageously rotatably supported with the aid of one or multiple bearings, preferably around a rotor axis. A magnet of a Hall sensor is fastened to the rotor shaft with the aid of an adapter. For the purpose of manufacturing, the magnet is inserted into a receptacle of the adapter in the axial direction in such a way that the magnet is at least partially surrounded by the adapter on the circumferential side in a radial direction. The adapter is subsequently plastically deformed to the inside in a radial direction in such a way that the magnet is held in the receptacle.

The adapter can be pressed into a mounting opening of the rotor shaft, which is advantageously introduced into an end face of the rotor shaft which is perpendicular to the rotor axis of the rotor shaft. The mounting opening advantageously runs at least partially along the rotor axis, which is also referred to as the rotational axis.

In the case of the electric machine, at least the adapter is thus plastically deformed in such a way that the magnet is held within the receptacle. Due to the plastic deformation, the adapter is, in particular, deformed in such a way that the magnet is advantageously partially enclosed by the adapter, so that an opening of the adapter is smaller than the extension of the magnet.

The electric machine can comprise a sensor of the Hall sensor which is integrated, for example, into a chip and which operates on the basis of the Hall effect. The sensor makes it possible to detect a rotating magnetic field generated with the aid of the magnet during the operation of the electric machine. The sensor is suitable, in particular provided and configured, for this purpose. For example, the sensor includes multiple connections, an electrical voltage being able to be applied to some of them.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
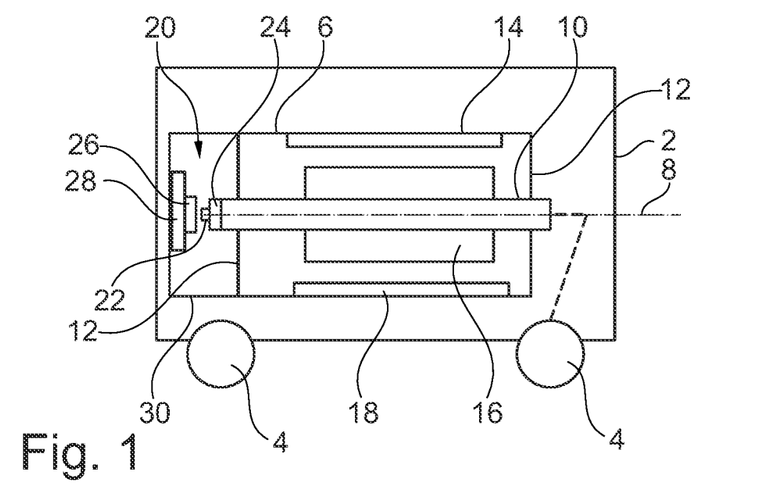
FIG. 1 schematically shows a motor vehicle, including an electric machine.

FIG. 1 shows a schematically simplified view of a motor vehicle 2, including multiple wheels 4, with the aid of which a contact to a roadway takes place. At least one of wheels 4 is driven with the aid of an electric machine 6 designed as an electric motor and is thus in operative connection therewith. A gearbox or the like is directly driven with the aid of electric machine 6, and wheel 4 is driven, in turn, by the gearbox or, for example, further components.

Electric machine 6 includes a rotor shaft 10, which is rotatably supported with respect to a rotor axis 8, which is also referred to as a rotation axis. Two bearings are used for this purpose, namely ball bearings, each of which is connected to an assigned end shield 12. A total of two end shields 12 are thus present, with the aid of which a hollow cylindrical housing 14, which is arranged concentrically to rotor axis 8, is closed on both sides. Rotor shaft 10 thus runs through housing 14.

A rotor 16 is arranged within housing 14, which is rotatably fixedly fastened to rotor shaft 10 and which comprises a number of permanent magnets. Rotor 16 is also provided with a hollow cylindrical design and is arranged concentrically to rotor axis 8. Rotor 16 is surrounded by a stator 18 on the circumferential side, which is fastened on an inside of housing 14. Stator 18 comprises multiple electric magnets, which are interconnected to form three electrical phases. The supply of power to the electric magnets, and thus also to the phases, takes place with the aid of a converter.

For this to take place without errors, electric machine 6 includes a Hall sensor 20, with the aid of which a rotational speed and/or position of rotor shaft 10 may be detected, and this also that of rotor 16 with respect to stator 18. Hall sensor 20 comprises a magnet 22 for this purpose, which is fastened to an adapter 24. Adapter 24 is made from a paramagnetic material, namely aluminum. As a result, the magnetic fields generated by magnet 22 are only slightly modified with the aid of adapter 24. Adapter 24, in turn, is rotatably fixedly fastened to an end of rotor shaft 10.

Hall sensor 20 also comprises a sensor 26, which operates according to the Hall principle. During operation, the magnetic fields generated by magnet 22, which is magnetized diametrically through the center point and arranged concentrically on rotor shaft 8, are detected with the aid of sensor 26. Sensor 26 is in the form of a chip and is fastened to a circuit board 28. Complete Hall sensor 20 is arranged within an electronics housing 30, which is fastened to one of end shields 12, and within which rotor shaft 10 ends on one side.

Figure 2:
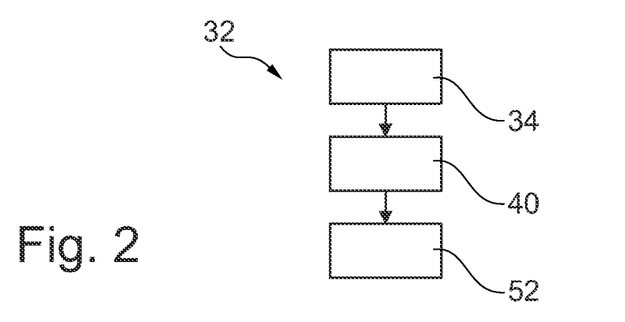
FIG. 2 shows a method for mounting a magnet of a Hall sensor on a rotor shaft of the electric machine.
Figure 3:
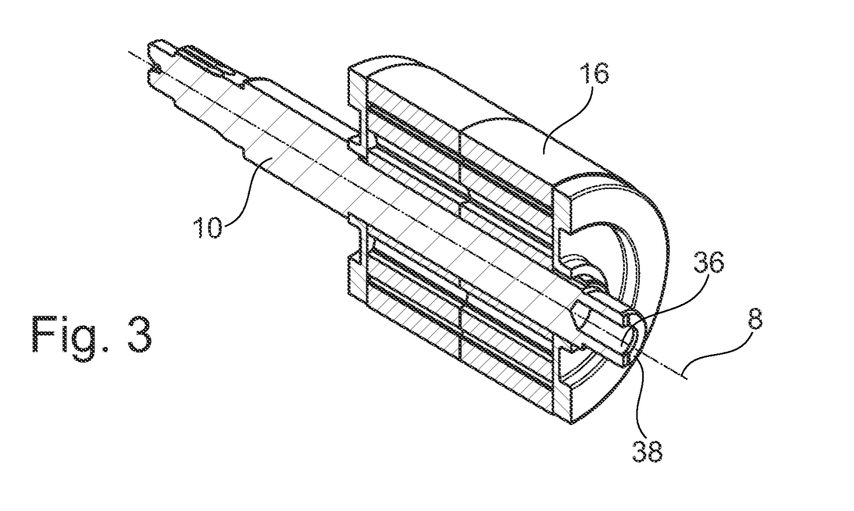
FIG. 3 shows a perspective sectional representation of the rotor shaft, including a rotor fastened thereto.
Figure 4:
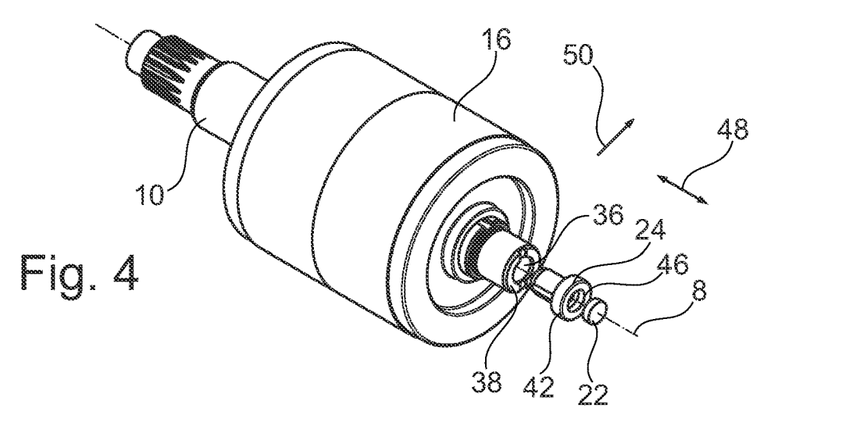
FIG. 4 shows a perspective view of an exploded representation of the rotor shaft, an adapter, and the magnet.

A method 32 for mounting magnet 22, which is a permanent magnet, on rotor shaft 10 with the aid of adapter 24 is illustrated in FIG. 2. In a first work step 34, rotor shaft 10, which is illustrated in a perspective sectional representation along rotor axis 8 in FIG. 3 and which is made from a steel, is fastened to rotor 16 on the circumferential side. The end of rotor shaft 10 situated within electronics housing 30 in the mounted state has a mounting opening 36, which is introduced into an end face 38 of rotor shaft 10 running perpendicularly to rotor axis 8. Mounting opening 36 is designed in the manner of a blind hole and runs along rotor axis 8 and is also designed to be concentric as well as rotationally symmetrical thereto.

Figure 5:
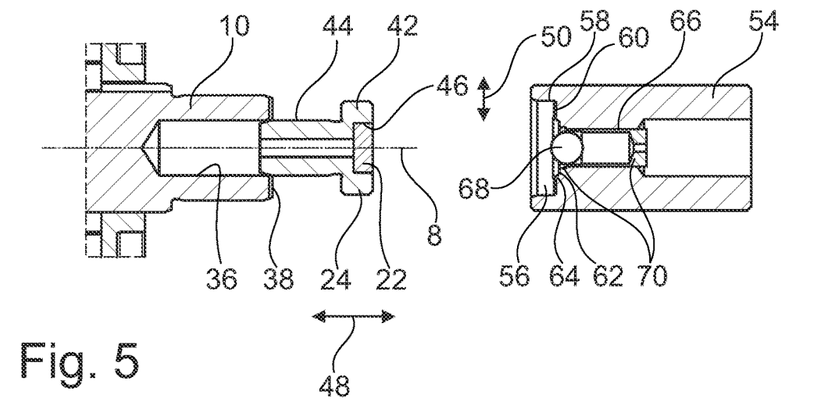
FIG. 5 shows a sectional representation of the rotor shaft, the adapter, and the magnet during mounting, in which a stamp is used.

In a subsequent second work step 40, adapter 24, which is provided with a nail-shaped design and includes a head 42 and a body 44 formed thereon with a reduced diameter, is inserted into mounting opening 36, as illustrated in FIG. 5. Hollow cylindrical body 44 extending along rotor axis 8 is arranged concentrically to rotor axis 8 and has the inner diameter of mounting opening 36 as its outer dimension or is slightly larger.

Head 42 has an enlarged outer diameter, compared to body 44, and a pot-shaped receptacle 46 is introduced into head 42 on the end opposite body 44, which is thus provided with the aid of a cylindrical recess. A fluidic connection of receptacle 46 to the interior of mounting opening 36 is given via hollow cylindrical body 44. Complete adapter 24 is provided with a rotationally symmetrical design with respect to rotor axis 8, and an axial direction 48 of adapter 24, along which body 44 extends, is in parallel to rotor axis 8.

Cylindrical magnet 22 is inserted into receptacle 46, for which purpose it is moved in axial direction 48. The outer diameter of magnet 22 is reduced by $5/100$ mm with respect to the inner diameter of receptacle 46, so that a clearance fit is created between magnet 22 inserted into receptacle 46 in axial direction 48 and adapter 24. The insertion also takes place without force. The height of receptacle 46, i.e., the extension in axial direction 48, corresponds to the extension of magnet 22 in axial direction 48, so that magnet 22 is completely surrounded by adapter 24 on the circumferential side in a radial direction 50, which is perpendicular to axial direction 48. Due to the dimensions, magnet 22 does not protrude over adapter 24, but is flush therewith, as illustrated in FIG. 5.

Figure 6:
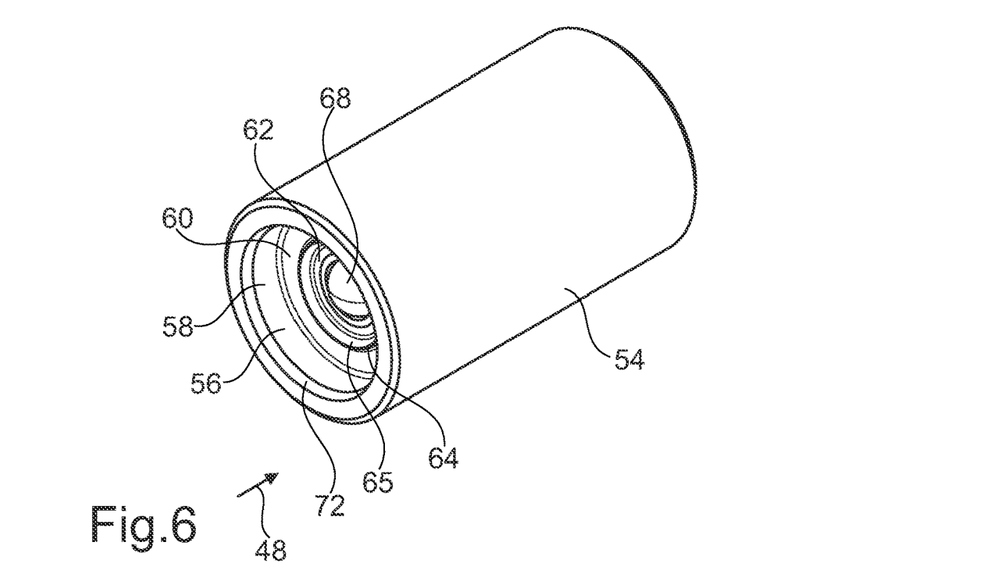
FIG. 6 shows a perspective view of the stamp.

In a subsequent third work step 52, a stamp 54 is used, which is already illustrated in the sectional representation in FIG. 5 and the perspective view in FIG. 6. Stamp 54 is essentially cylindrical and has a stamp opening 56 on an end face, which is arranged for carrying out method 32 in such a way that it extends concentrically to rotor axis 8 and thus runs in parallel to axial direction 48.

Stamp 54 is made from a hardened steel, and stamp opening 56 is essentially provided with a pot-shaped design and thus has a circumferential edge 58, which runs in parallel to axial direction 48. Stamp opening 56 also has a base 60, which is arranged perpendicularly to axial direction 48.

An indentation 62 running concentrically to rotor axis 8 and thus in axial direction 48 is introduced into base 60 and is thus situated in the middle of base 60. Indentation 62 is offset in axial direction 48 away from base 60 with respect to edge 58. A ring-shaped nose 64 is arranged between indentation 62 and base 60. In other words, base 60 transitions into indentation 62 via nose 64. Base 60 is thus essentially ring-shaped and extends between nose 64 and edge 58. Nose 64 has a V-shaped cross section in parallel to rotor axis 8 and projects into stamp opening 56. A flank 65, which also has a circumferential ring-shaped design, is thus provided with the aid of nose 64 and is inclined with respect to radial direction 50 as well as with respect to axial direction 48, and which is also a constituent part of stamp opening 56.

A device 66 is arranged in the central part of indentation 62, which is also oriented concentrically to rotor axis 8. Device 66 includes a sphere 68, which is movably supported in axial direction 48 between two stops 70. A spring is arranged between stop 70 facing away from stamp opening 56 and sphere 68, so that sphere 68 is spring-loaded and pressed onto stop 70 assigned to stamp opening 56. When sphere 68 rests against this stop 70, sphere 68 extends into stamp opening 56, so that this part at least partially protrudes over base 60 and indentation 62 in axial direction 48 and is integrated thereinto.

Figure 7:
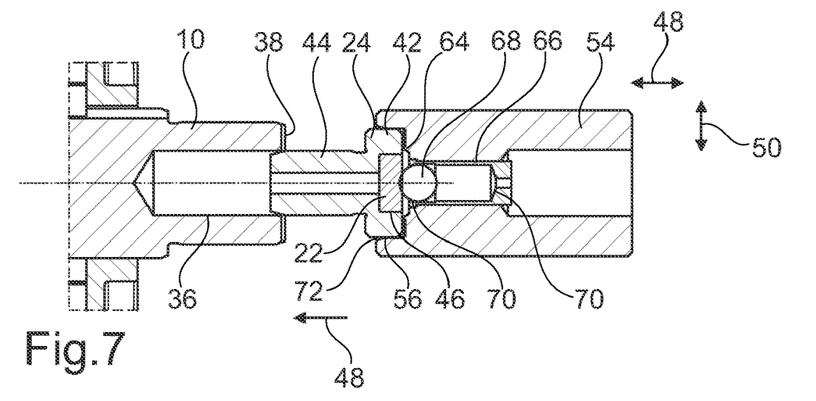
FIGS. 7 and 8 show a sectional representation and perspective sectional representation, respectively, of the rotor shaft, the adapter, and the magnet during assembly at different points in time.

In the third work step, as illustrated in FIG. 7, adapter 24, namely its head 42, is positioned in stamp opening 56. For this purpose, stamp 54 is moved in axial direction 48, and adapter 24 plunges into stamp opening 56. Edge 58 of stamp opening 56 has a chamfer 72 on the end facing away from base 60, so that the introduction of adapter 24 is made easier.

During a further insertion/movement of stamp 54 in axial direction 48, sphere 68 first comes into mechanical contact with magnet 22, so that magnet 22 is stabilized within receptacle 46. Upon a greater application of force, sphere 68 retreats against the spring pressure in the direction of the other stop 70. Nose 64 then comes into mechanical contact with adapter 24, namely its end face. The radius of nose 64 is smaller than the radius of magnet 22, so that a direct mechanical contact of magnet 22 with nose 64 or base 60 is prevented. In other words, magnet 22 is in direct mechanical contact only with sphere 68 as the only component of stamp 54.

Figure 8:
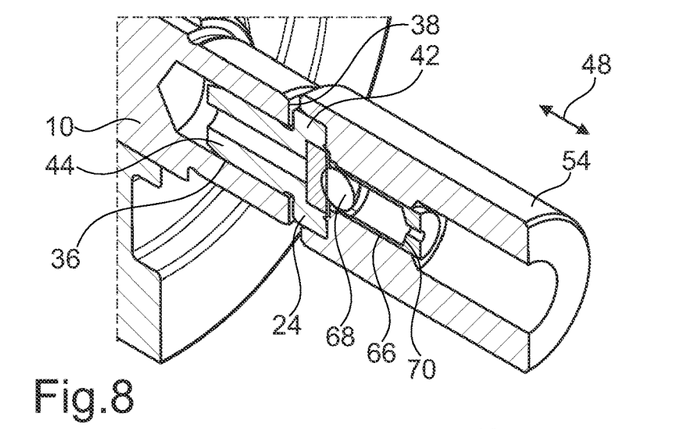

Due to the force applied with the aid of stamp 54 to head 42 via nose 64, body 44 of adapter 24 is pressed into mounting opening 36 of rotor shaft 10, as illustrated in FIG. 8. Due to the dimensions of body 44 and mounting opening 36, a press fit is created therebetween. Due to the device 66 and retreating sphere 68, the force applied to magnet 22 is limited or at least reduced in comparison to the force applied to adapter 42 with the aid of stamp 54. As a result, device 66 is used to limit the force to be applied to magnet 22.

In summary, adapter 24 is positioned in mounting opening 36 of rotor shaft 10, and adapter 24 is pressed into mounting opening 36 in axial direction 48 with the aid of stamp 54. A slight elastic deformation of body 44 occurs, so that adapter 24 is captively fastened to rotor shaft 10.

Figure 9:
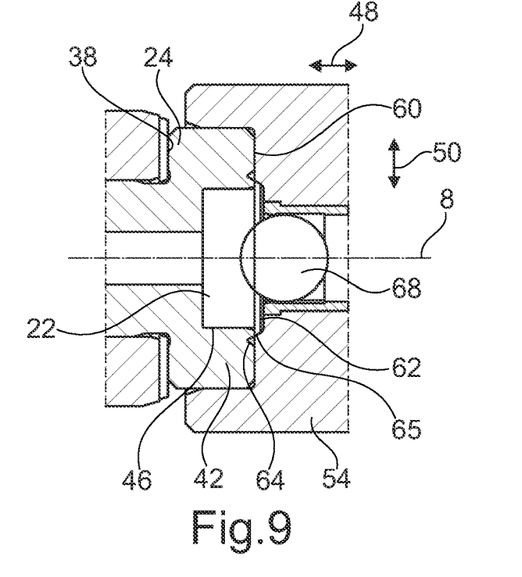
FIG. 9 shows a sectional representation of an enlargement of the rotor shaft, the adapter, the magnet, and the stamp.

Once head 42 rests against end face 38, a further movement of adapter 24 in axial direction 48 is prevented with the aid of rotor shaft 10, as illustrated in FIG. 8. However, force continues to be applied by stamp 54 in axial direction 48, for which reason nose 64 plunges into head 42 of adapter 24, as illustrated in FIG. 9 in a sectional representation along rotor axis 8. A circumferential notch in head 42 is created with the aid of nose 64.

A portion of adapter 24 is deformed into indentation 62 with the aid of flank 65, which forms the inner boundary off nose 64 in radial direction 50, so that magnet 22 is encompassed at least on the edge side on the side facing indentation 62. As a result, stamp 54 is moved in axial direction 48 in such a way that adapter 24 is plastically deformed to the inside with the aid of flank 65 in radial direction 50. The deformation is such that magnet 22 is held in receptacle 46. The movement of stamp 54 takes place until base 60 rests over a wide area against head 42, so that a comparatively high counterforce is provided. Stamp 54 is then removed from electric machine 6, and method 32 is concluded, stamp 54 being used to carry out method 32.

Due to method 32, adapter 24 has been plastically deformed and has the circumferential ring-shaped notch, which was created with the aid of nose 64. Due to the plastic deformation, magnet 22 is captively held in receptacle 46, the deformation of adapter 24 taking place with the aid of cold caulking.

The invention is not limited to the exemplary embodiment described above. Instead, other variants of the invention may be derived herefrom by those skilled in the art without departing from the subject matter of the invention. Moreover, in particular, all individual features described in connection with the exemplary embodiment may also be otherwise combined with each other without departing from the subject matter of the invention.

What is claimed is:

1. A method for mounting a magnet of a Hall sensor on a rotor shaft of an electric machine via an adapter, the method comprising:
    inserting the magnet into a receptacle of the adapter in an axial direction such that the magnet is at least partially surrounded by the adapter on a circumferential side in a radial direction, the receptacle being recessed from an end face of the adapter;
    positioning the adapter in a stamp opening of a stamp which has a flank that is inclined with respect to the radial direction; and
    moving the stamp in the axial direction, wherein during the moving of the stamp in the axial direction, the flank of the stamp contacts the end face of the adapter to plastically deform the adapter towards an inside in the radial direction such that the magnet is held in the receptacle.

2. The method according to claim 1, wherein the adapter is positioned in a mounting opening of the rotor shaft, and wherein during the movement of the stamp in the axial direction, the adapter is pressed into the mounting opening in the axial direction.

3. A stamp for carrying out the method according to claim 1, the stamp comprising:
    an end face;
    a stamp opening, the stamp opening being recessed from the end face to form a receptacle for receiving an adapter with a magnet, and the stamp opening having a base that is oriented substantially perpendicular to the axial direction; and
    a nose that protrudes from the base into the stamp opening,
    wherein an inner surface of the nose, with respect to the radial direction, forms a flank that is inclined with respect to an axial direction.

4. The stamp according to claim 3, wherein the nose is circumferential with respect to the radial direction, such that the nose is ring-shaped with the inner surface of the nose being a circumferential inner surface that forms the flank.

5. The stamp according to claim 4, wherein an indentation is formed in the base of the stamp, the indentation being circumferentially surrounded by the nose, and wherein the inner circumferential surface of the nose extends to a base of the indentation, such that the flank, that is inclined with respect to the axial direction, extends to the base of the indentation.

6. The stamp according to claim 5, wherein an axial bore is provided in the base of the indentation, wherein a device that limits the force to be applied to the magnet is provided in the bore, wherein the device has a sphere that is spring-loaded so as to be movable in the axial direction, and wherein the sphere partly extends into the stamp opening.

7. The stamp according to claim 3, wherein a device is integrated into the base to limit the force to be applied to the magnet.

8. The stamp according to claim 7, wherein the device has a sphere that is spring-loaded so as to be movable in the axial direction, wherein the sphere partly extends into the stamp opening.

9. The stamp according to claim 3, wherein the flank remains stationary with respect to the base and stamp opening.

10. The method according to claim 1, wherein the stamp has an end face, the stamp opening forming a receptacle that is recessed from the end face, the stamp opening having a base that is oriented substantially perpendicular to the axial direction, the base having a nose that protrudes therefrom into the stamp opening, wherein an inner surface of the nose, with respect to the radial direction, forms the flank that is inclined with respect to the axial direction, and
   wherein during the moving of the stamp in the axial direction, the nose contacts the end face of the adapter to create a notch in the end face of the adapter and then the flank, that is inclined with respect to the axial direction, contacts the end face of the adapter at the notch to plastically deform the adapter in the radial direction.

11. The method according to claim 10, wherein the nose is ring-shaped with the inner surface of the nose being a circumferential inner surface that forms the flank,
   wherein an indentation is formed in the base of the stamp, the indentation being circumferentially surrounded by the nose,
   wherein the inner circumferential surface of the nose extends to a base of the indentation, such that the flank, that is inclined with respect to the axial direction, extends to the base of the indentation,
   wherein an axial bore is provided in the base of the indentation,
   wherein a device that limits the force to be applied to the magnet is provided in the bore,
   wherein the device has a sphere that is spring-loaded so as to be movable in the axial direction,
   wherein the sphere partly extends into the stamp opening, and
   wherein during the moving of the stamp in the axial direction, the sphere comes into contact with the magnet before the nose of the stamp contacts the end face of the adapter, and due to the sphere being spring-loaded, the contact between the sphere and the magnet causes the sphere to retreat into the bore of the stamp while still maintaining contact with the magnet, such that the sphere stabilizes the magnet in the receptacle of the adapter during the plastic deformation of the adapter.

* * * * *